Patented Nov. 27, 1934

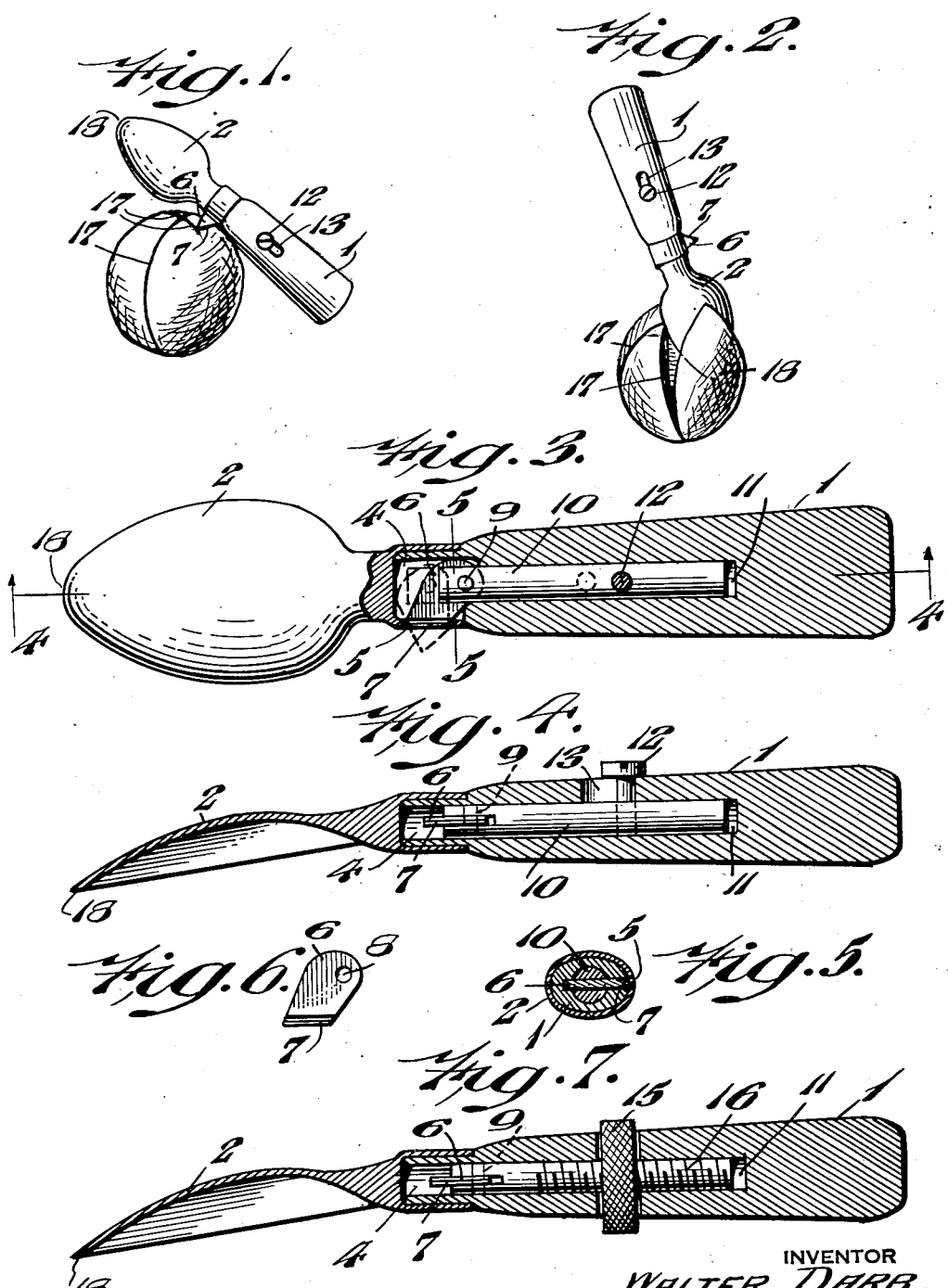

1,982,193

UNITED STATES PATENT OFFICE 1,982,193

FRUIT PEELING DEVICE

Walter Darr, Philadelphia, Pa.

Application October 25, 1932, Serial No. 639,406

2 Claims. (Cl. 146—3)

My invention relates to a new and useful fruit peeling device of the general character disclosed in such patents as Beil No. 754,191 and Crandall No. 637,820, whereby any thick skinned fruit, such as oranges, grapefruit, and the like, may be rapidly and efficiently peeled in a sanitary and decorative manner. In peeling oranges with an ordinary knife whereby the peel is cut into a long, more or less continuous tape, the white skin intervening between the meat of the orange and the outer skin is not adequately removed and it frequently happens that the meat of the orange is cut by the knife. This process is further very slow and does not lend itself to decorative effort. This practice is also unsanitary and unattractive, particularly when a host or hostess peels an orange for the use of one of the guests, since the peeled orange is thus subjected to manipulation by the hand of the person peeling it. Other methods of peeling oranges, while possessing all of these disadvantages, also sometimes result in the squeezing of the spirituous and oily extracts contained in the skin of an orange and other citrous and non-citrous fruits over the hands of the person peeling the orange, which extracts are thereafter transferred to the orange meat and impart to it a very undesirable taste.

In order to obviate the above and other disadvantages, I have devised a novel peeling device which includes an adjustable cutting element for slitting the skins of various fruits which vary in thickness, and a scoop or stripper element for separating the skin from the meat according to the slits cut in the skin by said cutting element whereby the skin may be completely separated from the meat without the meat being touched by the hand and without any danger of cutting into the meat.

To the above ends, my invention consists in a handle element which is adapted to carry at one end thereof a scoop or other stripping device of the desired shape and size to effect stripping along any desired decorative lines, and a cutting element carried by said handle in an adjustable and disappearing manner, said cutting element being operable from a point on the handle which is normally gripped in the operation of the device.

My invention further relates to various other novel features of construction and advantage, all as hereinafter described and claimed in the accompanying drawing in which:

Figure 1 represents a view in side elevation illustrating the operation of my device in its first stage, namely: the slitting of the skin of an orange or other fruit.

Figure 2 represents a view similar to Figure 1 showing the second stage of operation, namely: the stripping of the skin from the orange.

Figure 3 represents a plan view partly in section and having some parts broken away to show the internal construction.

Figure 4 represents a section on line 4—4 of Figure 3.

Figure 5 represents a section on line 5—5 of Figure 3.

Figure 6 represents a plan view of the cutting element forming part of the invention and shown in Figures 1, 2 and 3.

Figure 7 represents a view similar to Figure 4 showing a modified form of construction.

Referring to the drawing in which like reference characters indicate like parts, 1 designates a handle of any suitable shape and size which is adapted to carry at one end thereof a stripping element 2 which may be in the form of a prong, probe, spoon, or other contour, said stripping element being preferably detachable from the handle 1 so as to permit the change of the stripping element from one form to another according to the fruit to be peeled. In the present instance the fruit illustrated being an orange, a stripping element of the general contour of a flat spoon with an outer dull edge is preferable since it approximates the spheroidal contour of an average orange. To the end of the handle 1 is preferably secured the sleeve or collar 4 which has an opening 5 along one edge thereof through which the knife or cutting element 6 is adapted to project. The cutting element 6 is provided with the sharp edge 7 and with the hole 8 through which passes the pivot pin 9 which also engages the front end of the sliding bar 10. The sliding bar 10 reciprocates within the seat 11 and is engaged by the screw or its equivalent 12 which reciprocates in the slot 13. With the handle 1 gripped in the hand the thumb is placed on the screw 12 and the screw 12 is pushed to the left in the slot 13 thereby forcing the cutting element 6 out through the opening 5 upon the pivot pin 9. When the screw 12 is in the position shown in Figure 4 the cutting element 6 is completely enclosed within the collar 4, and when the screw 12 is in the dotted position shown in Figure 3 the cutting element 6 assumes the position shown in dotted lines also in Figure 3. The extent to which the screw 12 is moved in the slot 13 determines the extent to which the cutting element 6 projects through the opening 5.

In Figure 7 a modified construction is shown wherein a knurled nut 15 engages a threaded rod 16 whereby the turning of the nut will advance or retard the rod, thus projecting the cutting element 6 out of or withdrawing said cutting element 6 into the sleeve or collar 4. The adjustability of the cutting element 6 makes it possible to cut or slit the skin of the fruit to be peeled without cutting the meat thereof since the projection of the cutting element 6 can be regulated to the apparent approximate thickness of the skin to be slit. As shown in Figure 1, the cutting element 6 is made to project to the desired extent through the collar 4 by manipulation of the screw 12 or the knurled manipulating nut 15 and is then applied to the skin of the fruit to form therein the slits 17 which may be of any desired shape or spacing. After the slitting operation is completed the cutting element 6 is withdrawn into an out-of-the-way position inside the collar 4 and the front end 18 of the stripping element 2 is then forced into the skin at the junction of any two slits 17 until it reaches to, but without piercing the meat of the fruit whereupon the stripping element 2 is gently thrust in a curved outward motion to separate the sector of the skin being acted on from the meat of the fruit. The tapered end of the stripper 2 permits the starting of the stripping operation and the finishing thereof at the relatively narrow points occurring at the junctions of the slits 17 and the operation is carried on until all the sectors thus formed are separated, whereupon the orange or other fruit is completely peeled but is nevertheless still enclosed in the loose skin thereby eliminating all contact of the fingers with the meat of the fruit. It is further apparent that my device lends itself to the decorative peeling of an orange or other fruit by the formation of slits which divide the skin into sectors or portions bearing the desired contour.

Having thus described my invention, what I claim as new and desire to secure by Letters Patent is:

1. A fruit peeling device comprising a handle, a stripping tool carried thereby, a cutting tool pivotally mounted in said handle intermediate said handle and said stripping tool, and means associated with said handle for projecting said cutting tool out of said handle into an operative position and for withdrawing said cutting tool within said handle into an out-of-the-way inoperative position.

2. A fruit peeling device comprising a handle, a stripping tool carried thereby, a cutting tool pivotally mounted in said handle intermediate said handle and said stripping tool, and means associated with said handle for adjustably projecting said cutting tool out of said handle into an operative position and for adjustably withdrawing said cutting tool within said handle into an out-of-the-way inoperative position.

WALTER DARR.